United States Patent
Boyns et al.

(10) Patent No.: US 7,187,303 B2
(45) Date of Patent: Mar. 6, 2007

(54) FLIGHT TIMER

(75) Inventors: Frederick C. Boyns, Issaquah, WA (US); Craig Kilcourse, Everett, WA (US); Cameron Smith, Seattle, WA (US); Blake Stancik, Mukilteo, WA (US); Scott Thielman, Seattle, WA (US)

(73) Assignee: Aviation Supplies & Academics, Inc., Newcastle, WA (US)

( * ) Notice: Subject to any disclaimer, the term of this patent is extended or adjusted under 35 U.S.C. 154(b) by 55 days.

(21) Appl. No.: 10/816,972

(22) Filed: Apr. 1, 2004

(65) Prior Publication Data

US 2005/0231391 A1 Oct. 20, 2005

(51) Int. Cl.
G08B 21/00 (2006.01)

(52) U.S. Cl. .............. 340/945; 340/947; 340/973; 340/309.16; 701/204

(58) Field of Classification Search .......... 340/945, 340/947, 990, 995.26, 953, 973, 309.16; 345/87, 98; 701/9, 204; 368/10, 28–30, 368/294, 295
See application file for complete search history.

(56) References Cited

U.S. PATENT DOCUMENTS 5,319,617 A * 6/1994 Sonoda ................ 368/294
6,144,619 A * 11/2000 Reisman ................ 368/10
6,259,655 B1 * 7/2001 Witort ................ 368/28
6,414,907 B1 7/2002 Pennington
2004/0266491 A1 * 12/2004 Howard et al. .......... 455/567

OTHER PUBLICATIONS

Website: http://www.pilotmall.com/thestore/prods/494.html.
Website: http://www.westbend.com/westbend/finditem.cfm?itemid=1056.
User's manual: "Stopwatch Electronic Timer".
Website: http://web.archive.org/web/20010616133723/www.westbend.com/westband/catalog.cfm?dest=itempg&itemid=1092&secid=8&linkon=subsection&linkid=82.
Website: http://www.lonegoose.com/audio_specs.html.

* cited by examiner

Primary Examiner—Davetta W. Goins
(74) Attorney, Agent, or Firm—DWC Law Firm, PS.

(57) ABSTRACT

A timer usable in navigating and piloting an aircraft, the timer having a plurality of application modes for management of time and numeric data, including an approach mode, a fuel mode, a chronograph mode and a clock mode. Each application mode can drive independent but simultaneous time count sequences for use in flight management and navigation such as counting down approach times, fuel-tank switching intervals and other time sensitive events, as well as providing military time, standard time and UTC time.

16 Claims, 11 Drawing Sheets

FLIGHT TIMER

BACKGROUND OF THE INVENTION

1. Field of the Invention

The present invention relates to portable flight timers for use in aviation.

2. Description of Related Art

Timing apparatus can be important to a pilot in a variety of navigational and flight management scenarios. One navigational example of where this need arises is in executing non-precision runway approaches under instrument flight rules (IFR), commonly executed by private pilots. A Missed Approach Point (MAP) can be determined based on the aircraft's predicted speed, and is the point by which the aviator must establish satisfactory visual contact with the runway or abort the landing and follow the airport's particular Missed Approach procedures. Pilots commonly use timers to countdown a predetermined time after passing a Final Approach Fix (FAF) to estimate whether the MAP has been passed. This predetermined time, the approach time, can vary depending on the speed of the aircraft. For example, several approach times may be provided to, or calculated by a pilot with each corresponding to a different approach speed of the aircraft. The actual approach time selected for use will depend on the speed of the aircraft when passing the FAF.

There are several circumstances in which pilots may need to have access to multiple predetermined approach times, preferably at their "finger tips." For example, a pilot may need to fly to several destination airports or have several home airports. Each runway for those locations will have associated approach times from the FAF to the MAP depending on various factors, such as approach speed of the aircraft. Other circumstances may require a pilot to choose between a plurality of predetermined approach times just before passing a FAF because the speed of the approach can determine the appropriate approach time.

In another scenario, more akin to flight management, fuel in the fuel tanks on either side of a plane may have to be consumed on an alternating basis to maintain stability of the plane. The pilot can switch fuel tanks on predetermined time intervals based on the pilot's empirical experience with the plane or other knowledge of the plane's particular flight characteristics. In either case, a timer can be employed.

The examples provided above illustrate some timer needs for aviators and an exhaustive description here would obscure the present invention. However, even considering only the illustrated examples, one can see the need to manage event timing. That is, a pilot may need to time multiple events and access timing data simultaneously, such as timing a fuel event while selecting and starting a countdown of an approach time or monitoring a time between waypoints. In other scenarios, the pilot may need flexible timing operations, such as gauging an appropriate fuel time switching interval by counting up on a timer, then switching fuel tanks and counting down. There is a need for a portable flight timer that can be easily operated by a pilot while providing capability to manage and employ a myriad of essential time and other numeric data for use in flight management and navigation.

BRIEF SUMMARY OF THE INVENTION

The present invention resides in a portable flight timer normally used in aviation. The timer has the capability to manage and employ multiple time event related parameters that can be set by a user. In some embodiments the user, typically a pilot or navigator, can operate the flight timer in a first application mode to store multiple approach times and associate the approach times with unique identifiers to help manage the approach times. The approach times can then be selected on the flight timer during flight depending on the circumstances and counted down on the flight timer immediately after being selected.

In other embodiments, the portable flight timer can also be used to countdown fuel tank switching times. The flight timer can have at least a second application mode, other than the approach time mode, that allows the flight timer to count a fuel-tank-switching time that can be started or stopped independently and counted simultaneously with (or not simultaneously) a countdown sequence for an approach time. Each of the application modes can have indicators to indicate to a pilot which mode and which counting sequence he or she is viewing, and the relationship of the counting sequence to the aircraft (i.e. when viewing the fuel-tank switching count, a display of the flight timer can indicate "fuel," while when viewing the approach time count, a display of the flight timer can indicate "approach.")

In still other embodiments, the portable flight timer also has a third application mode, such as a chronograph mode that can also drive a counting sequence simultaneously with (or not simultaneously with), and independently from, the counting sequences of the approach mode and fuel mode. In this mode, the flight timer can display a counting sequence without displaying an association with approach time or fuel time such that the pilot may use this mode to time a variety of other time sensitive events in flight without confusing various counting sequences that may be running simultaneously.

The flight timer can also have a clock mode that is capable of display three time formats, standard, military and UTC time. Also, a note function can be available that is programmable to display a note, such as a critical cruising altitude or a radio frequency.

DETAILED DESCRIPTION OF THE INVENTION

In the following description, certain specific details are set forth in order to provide a thorough understanding of various embodiments of the invention. However, upon reviewing this disclosure one skilled in the art will understand that the invention may be practiced without many of these details. In other instances, well-known structures associated with stopwatches, clocks and timers have not been described in detail to avoid unnecessarily obscuring the descriptions of the embodiments of the invention.

The discussion below discloses, among other things, using the present invention in aviation as a navigational and flight management aid or tool and describes such use and supporting structure in the context of various example embodiments. However, as well be understood by one skilled in the art after reviewing this disclosure, various other applications are contemplated, such as, for example, timing in sporting events, scientific experimentation and engineering related timing needs.

Terms in the following description related to orientation such as "below" and "above," "bottom" and "top," "left" and "right," "up" and "down," and "vertical" and "horizontal," are only intended to describe the position or orientation of elements in relation to the figures in which they are illustrated. Unless the context indicates otherwise, these terms of orientation are not intended to be restrictive in meaning outside of describing the orientation of a particular element relative to the subject illustration.

Figure 5:
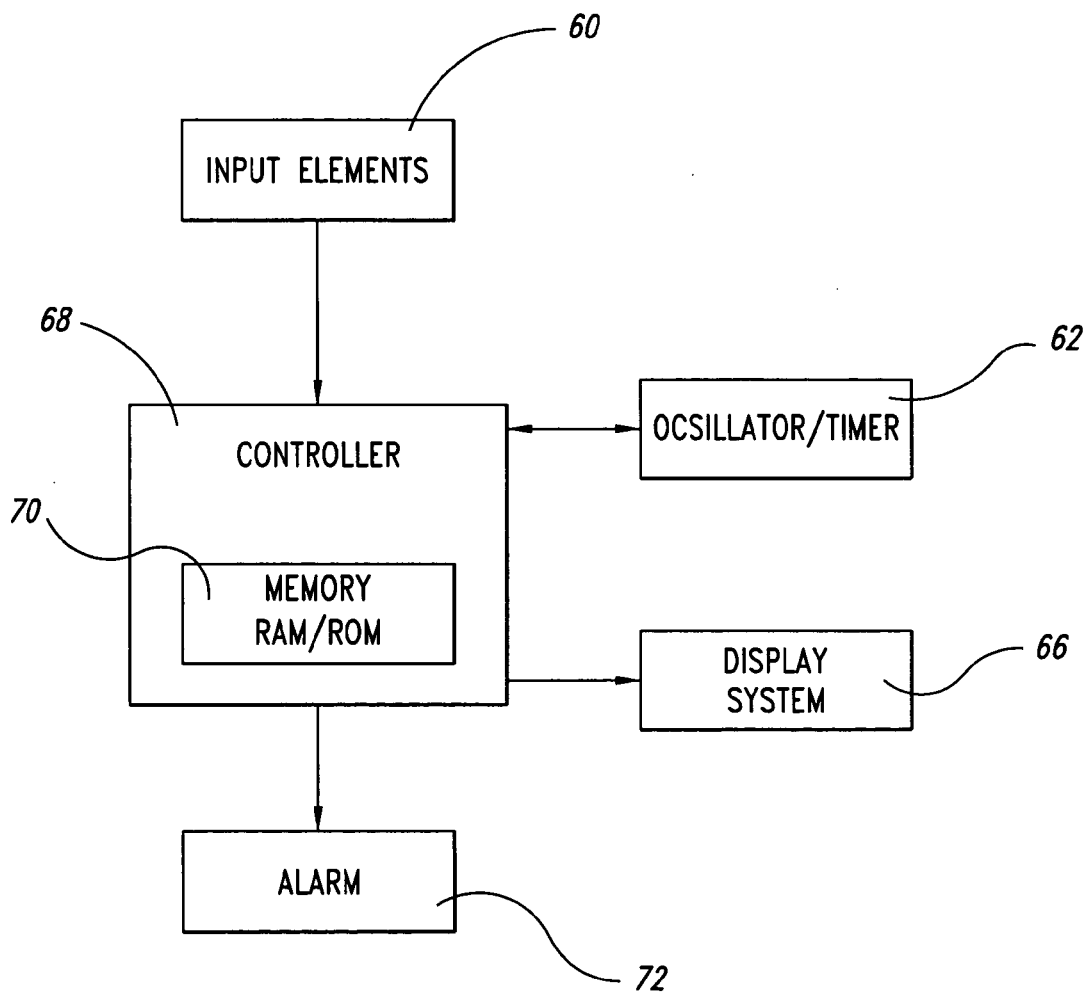
FIG. 5 is a simplified block diagram of various components comprising some embodiments of the present invention.

FIG. 5 shows a simplified block diagram for some embodiments of the present invention. As can be seen, the flight timer 1 can comprise a controller 68, such as a microcontroller or processor, connected to a memory system 70, an alarm element 72 and a display system 66. The memory system 70 can have volatile and non-volatile memory, such as RAM and read/write only memory (ROM) or EPROM. Also, various oscillators 62 such as a quartz crystal can be provided to generate a vibration frequency that can be monitored by one or more timers/counters 62 to produce count-up or countdown signals. The count-up or countdown signals can be displayed by the display system 66 in a numerical format understandable by a user. Furthermore, one or more input elements 60 are provided to allow a user to send signals to the various sections of the flight timer 1 components, such as to the controller 68 to perform functions or store information included in the user sent signal. The input elements 60 can comprise, inter alia, button-actuated switches and an incremental encoder switch coupled to a dial. As will be understood by one skilled in the art after reviewing the present disclosure, the elements described above can be employed in a variety of combinations to implement various embodiments of the invention as disclosed herein.

Figure 1:
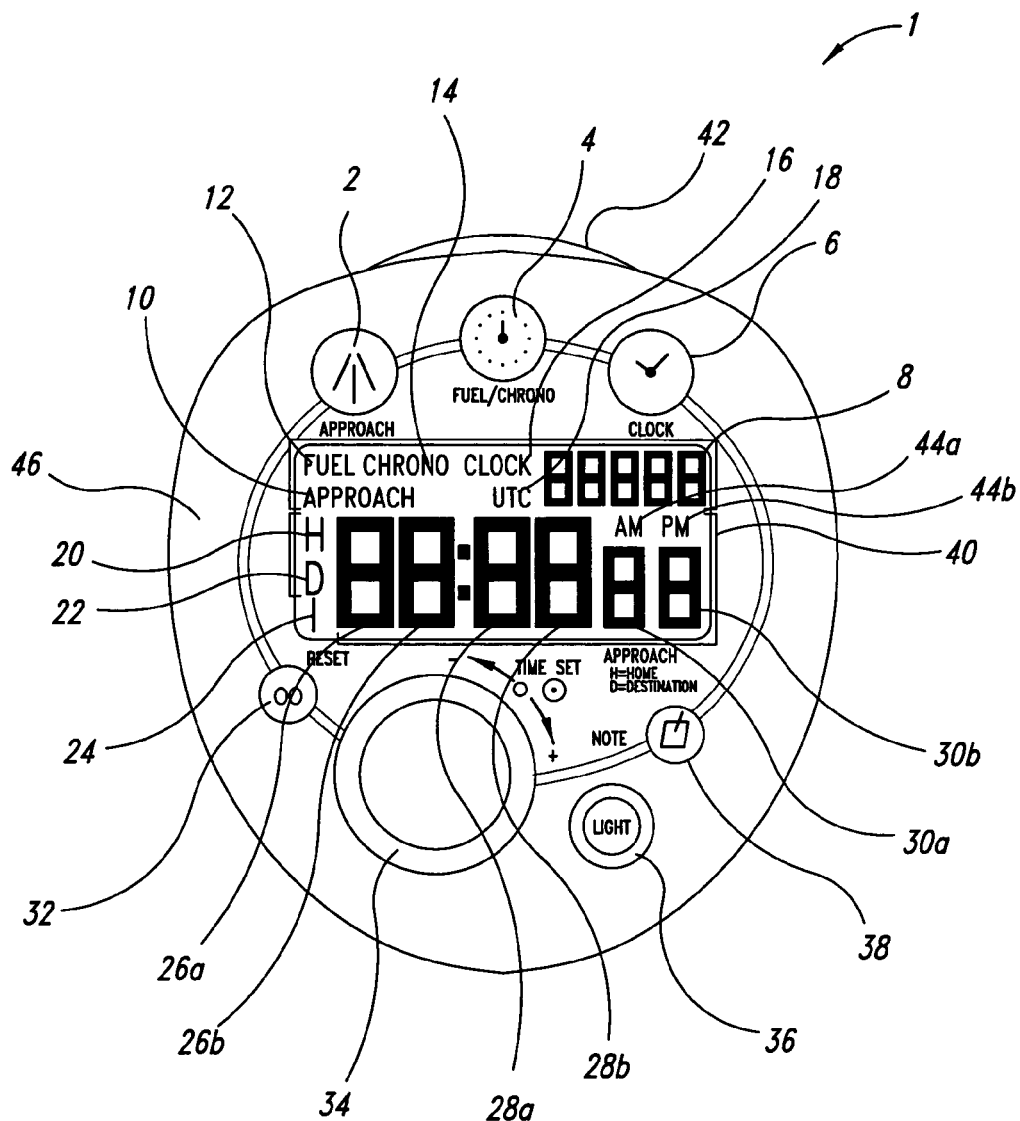
FIG. 1 is an overhead plan view of an embodiment of the flight timer of the present invention.

FIG. 1 is a front plan view of an embodiment of the present invention wherein the flight timer 1 includes a housing 46, a display system 66 with an LCD 40, a dial 34 and a plurality of buttons 2, 4, 6, 32, 36 and 38. The dial 34 and buttons can be used for actuating input elements 60, such as those described, supra.

Each of buttons 2, 4, and 6 can be used to select a different application mode of the flight timer 1—each application mode being applicable as an aviation tool/aid in flight management, flight navigation and general time monitoring during flight. For example, button 2 can be used to select a first application mode (approach mode), button 4 can be used to select second or third application modes (fuel time mode and chronograph mode) and button 6 can be used to selected a fourth application mode (clock mode). In some embodiments, buttons 2, 4, and 6 are labeled "APPROACH," "FUEL/CHRONO," and "CLOCK" respectively.

Figure 2:
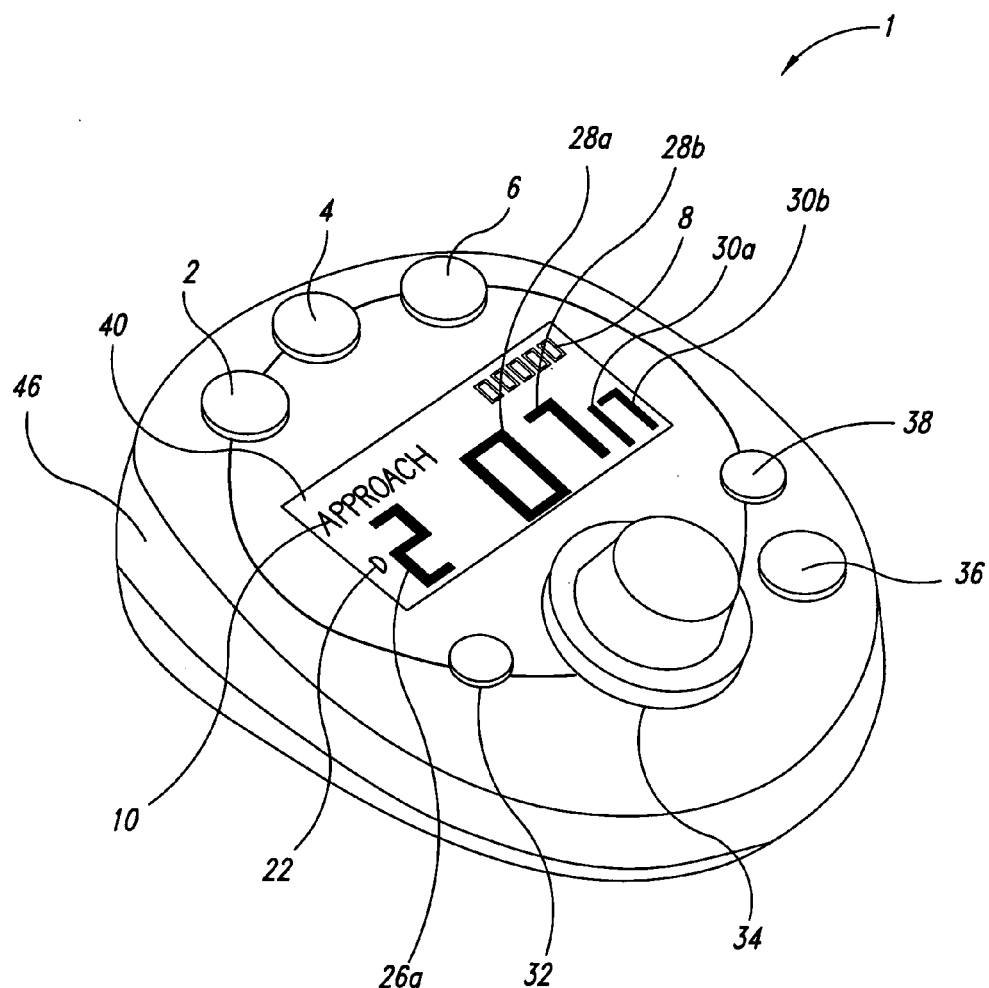
FIG. 2 is a perspective view showing a front portion of the flight timer of FIG. 1.
Figure 6:
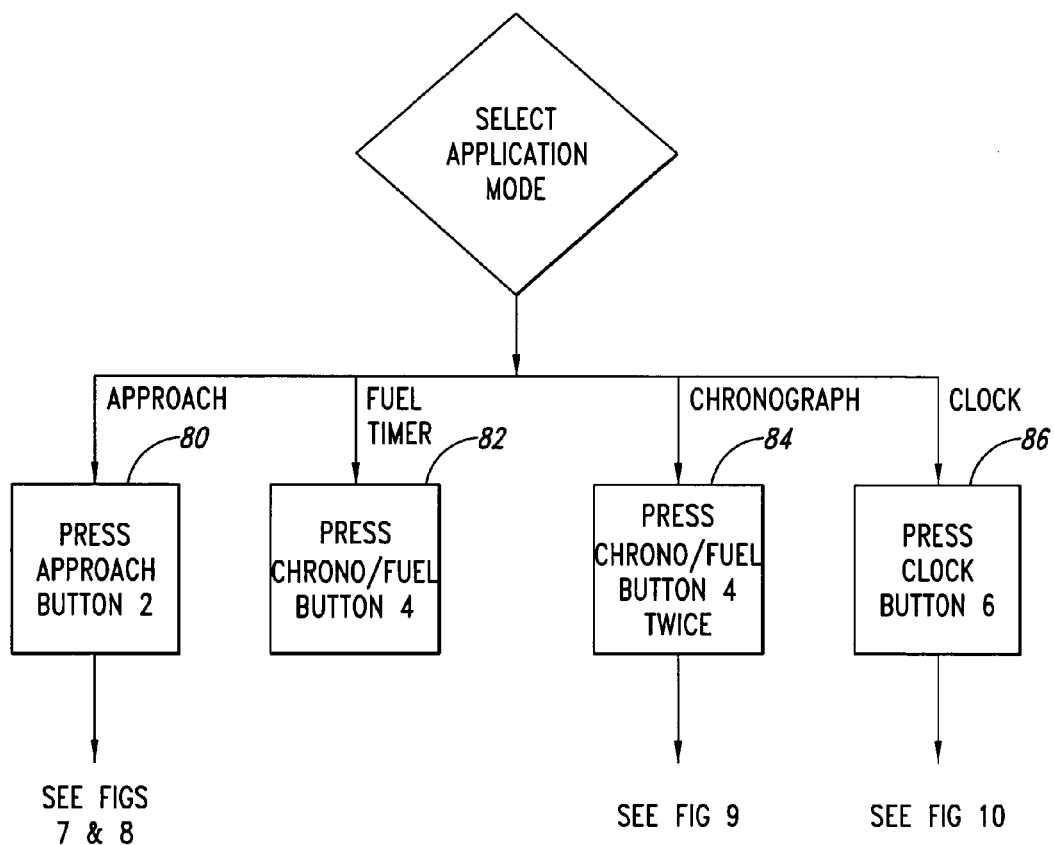
FIG. 6 is a step diagram for an embodiment of the present invention showing the beginning steps in selecting an application mode.

When the approach button 2 is depressed by a user, in accordance with step 80 in FIG. 6, LCD positions 10, 20, 22, 26a, 28a, 28b, 30a, 30b, and 8 can be active while all other display positions will be inactive. The LCD 40 will display an approach mode indicator 10, as best seen in FIGS. 1 and 2. Also, in this application mode, a user can store a plurality of approach times and associate each of the plurality of approach times with a unique approach time identifier displayable in positions 20, 22 and 26a of the LCD 40. This can be done by rotating the dial 34 to select an identifier. (See Step 90 in FIG. 7). The identifiers can be preprogrammed in the ROM 70 of the controller 68 and can comprise the alphanumeric/numeric combinations H1, H2, H3, H4, H5, H6, D1, D2, D3, D4, D5 and D6. FIG. 2 shows and example embodiment of the present invention wherein the unique identifier is displayed on the LCD 40 as "APPROACH" "D2" in positions 10, 22 and 26a of the LCD 40. After a unique identifier is selected, a user can set the approach time to be associated with the unique identifier.

In some embodiments of the present invention, a user sets minutes by first pressing the dial 34 (See Step 92 in FIG. 7) to activate a minutes setting mode, and then rotating the dial 34 to select the appropriate number of minutes for the approach time. (See Step 94 in FIG. 7). Once the desired minutes are set, the user can lock the minutes setting by again pressing the dial 34 (See Step 96 in FIG. 7). The flight timer 1 will then be in seconds setting mode and allow a user to select seconds by again rotating the dial 34. (See Step 100 in FIG. 7). Once a user is satisfied with the seconds setting, the dial 34 or approach button 2 can be pressed again to lock the setting (See Step 102 in FIG. 7).

Figure 7:
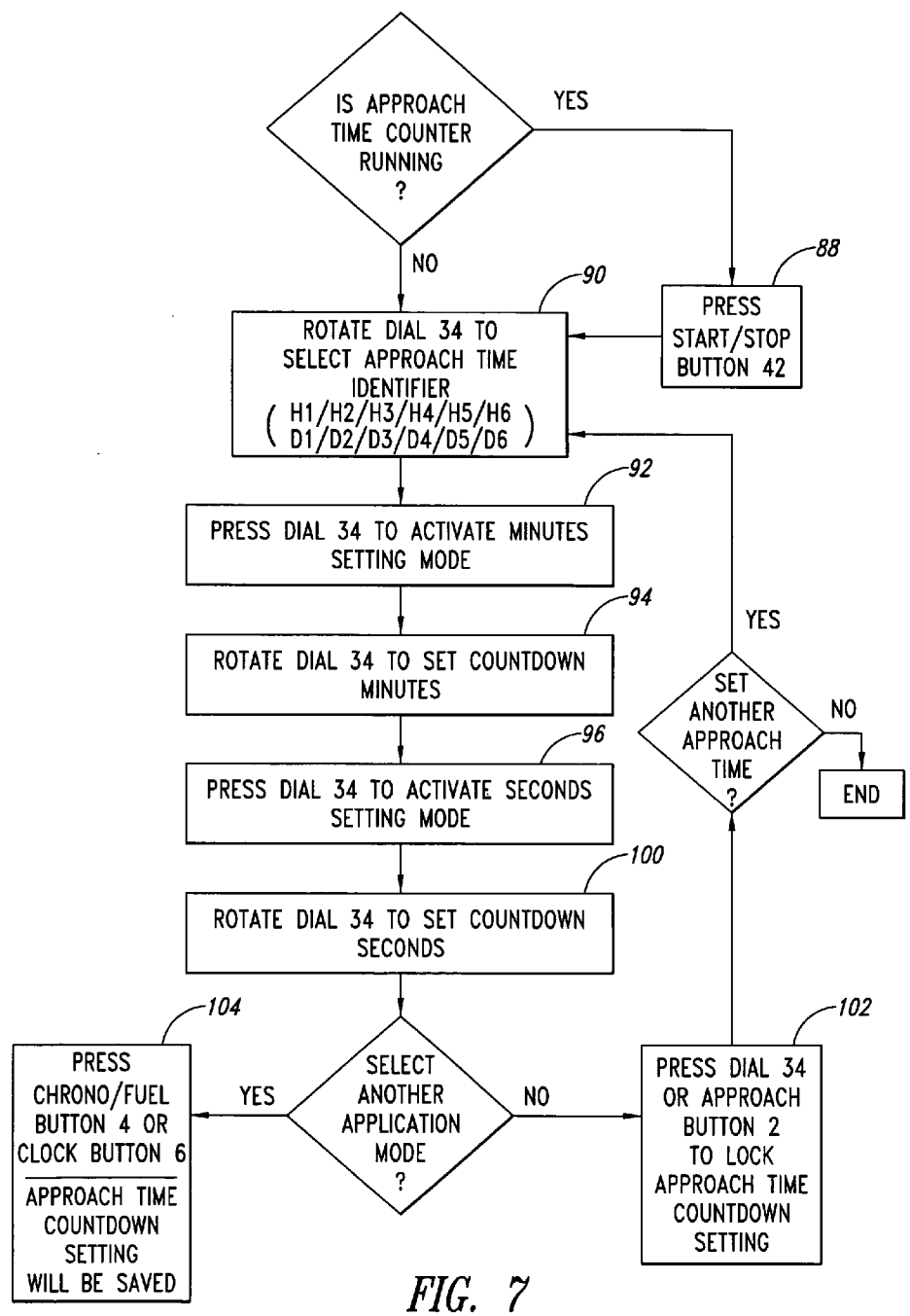
FIG. 7 is a step diagram for the flight timer illustrated in FIG. 1 for setting approach time countdown settings.

After the seconds setting is locked, the user may rotate the dial 34 to select another approach time identifier and set and store another approach time, etc., until the approach time storage capacity is reached for the flight timer 1. The illustrated embodiment of the flight timer 1 in FIGS. 1 and 7, is capable of storing a total of twelve (12) approach times. Other embodiments can store less than twelve (12) approach times or more than twelve (12) approach times that can each be associated with unique identifiers.

In the illustrated embodiments, the alphanumeric portion of the unique approach time identifiers denote home and destination airports. For example, H1, H2, H3, H4, H5 and H6 denote six (6) different stored approach times for home airports and D1, D2, D3, D4, D5 and D6 denote six (6) different stored approach times for destination airports. As will be understood by one skilled in the art after reviewing the present disclosure, the identifiers displayed can take on a variety of forms, as is contemplated herein. The identifiers could, for example, be numerical identifiers only (e.g., 1–12 or 1–24) or can include additional letter characters (e.g., Home One, Home Two). The mode indicator, such as "APPROACH" in position 10 of the LCD 40, is part of the identifier for each approach time, indicating the relationship of the displayed value and letters to approach times to the pilot. Again, other abbreviations or variations for the display in position 10 (e.g., "A," "AP," "AT," "APP.", etc.) are contemplated as long as they are sufficient to convey the mode of the flight timer to an aviator so that the aviator immediately understands which type of number he or she is viewing, that is, an approach time.

Pilots can apply the approach mode in different ways. For example, the plurality of stored approach times can each be used for different runways/airports. Alternatively, different approach times could be stored for different approach speeds. For example, two (2) or three (3) different approach times could be stored for a single home airport based on two different approach speeds and selectively used depending on the actual speed at the time of approach.

Figure 8:
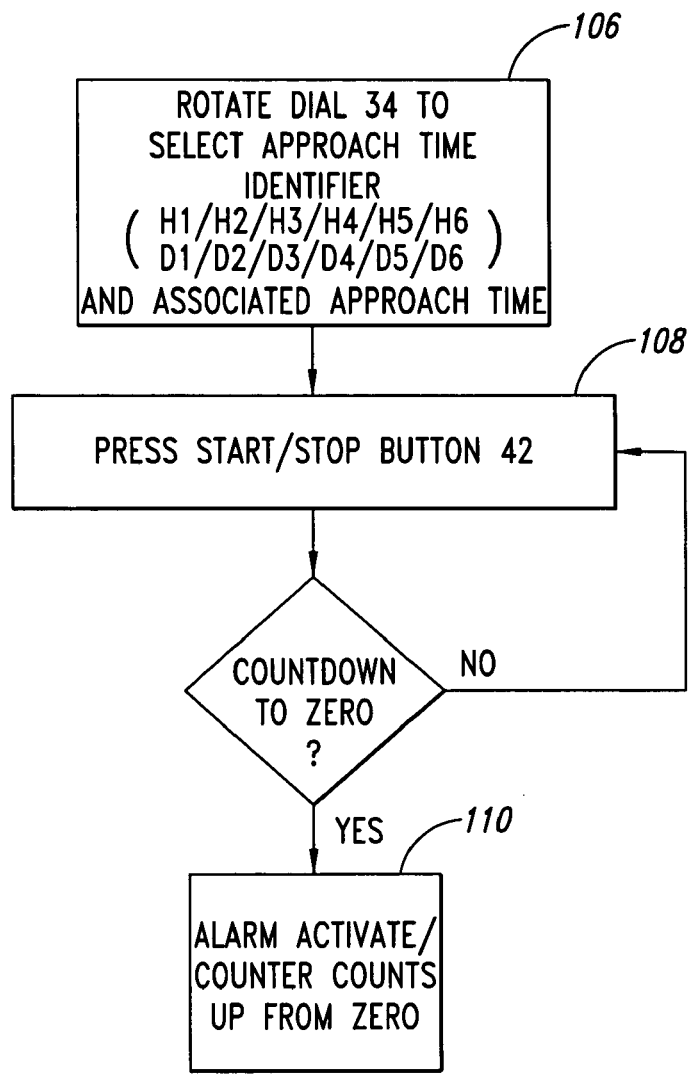
FIG. 8 is a step diagram for the flight timer illustrated in FIG. 1 for operating the flight timer in approach mode.

In practice, a pilot can apply the approach mode of the flight timer 1 by first depressing the approach button if needed (See Step 80 in FIG. 6) and then selecting a stored approach time by rotating dial 34. (See Step 106 in FIG. 8). In this manner, the pilot may toggle through the unique identifiers for the purpose of identifying and selecting the appropriate associated approach time setting. Once the user stored approach time is selected, the pilot can begin a countdown sequence from the stored approach time by depressing the start/stop switch 42 (Step 108 in FIG. 8) when the pilot's plane passes, for example, a Final Approach Fix.

In some embodiments, when and if the countdown sequence started by a user in the approach mode reaches zero, the alarm 72 is engaged. A user can stop the alarm by depressing the start/stop button 42. The alarm can comprise three simultaneous alarm indicators: (i) an audible signal; (ii) a flashing backlight that illuminates at least a portion of the LCD 40; and (iii) flashing of the numeric characters, 28a, 28b, 30a, 30b that display the status of the counting sequence for the approach mode (and the numeric portion of the unique identifier, 26a). If the user is in a different application mode or selects a different application mode (e.g., fuel timer mode or chronograph mode) while the approach time alarm is engaged or has been engaged, the alarm will comprise the following simultaneous indicators: (i') the indicator "APPROACH" in position 10 of the LCD 40 will flash on and off; (ii') the backlight will flash; and (iii') the audible signal will sound. In either case, in order to stop the flashing of LCD 40 numeric characters or the "APPROACH" indicator, a user will need to select the approach mode of the flight timer and then depresses the start/stop button 42. The flashing backlight and audible signal, on the other hand, can be configured to automatically discontinue after about ten (10) seconds. In other embodiments, the flashing backlight and audible signal can continue for a longer or shorter period of time. The simultaneous occurrence of the audible signal, flashing display characters and flashing backlight help ensure that a pilot will notice the alarm. Furthermore, the flashing "APPROACH" indicator in position 10 of the LCD 40 helps ensure that a pilot will be aware of the approach time alarm even when he or she has selected a different application mode. Alternatively, in other embodiments, the alarm can comprise various combinations of visible or audible alarms or consist only of one or more visible or audible alarms. Also, all of the alarms indicators can be configured to continue until a user stops them by actuating an input element.

In some embodiments, the approach time can be stored in memory, such as RAM, after being counted down or after being set by a user (as discussed above). For example, during a countdown sequence of an approach time, the user can stop the countdown by depressing the start/stop button 42 and this partially-counted-down value will be stored in memory 70. The user can then begin the countdown again from this partially-counted-down value by again depressing the start/stop button 42. Alternatively, in some embodiments, the user can depress the reset button 32, which sets the stored approach time to zero. The user can then initiate a count-up sequence from zero on the flight timer 1, or set a new approach time in accordance with FIG. 7.

In other embodiments, the flight timer is configured such that depressing the reset button 32 twice is required before an approach time will be set to zero. In such embodiments, depressing the reset button 32 only once resets the approach time to the previously stored value selected by the user, such as an approach time set in accordance with FIG. 7. In this manner, a user can restore a stored approach time after counting it down by simply depressing the reset button 32 without having to use the dial 34 to reset it.

When the fuel timer mode is selected by depressing button 4 in accordance with Step 82 of FIG. 6, positions 12, 26a, 26b, 28a, 28b, 30a, 30b, and 8 of the LCD 40 are active while all other positions of the display are inactive. The display will indicate the fuel timer mode to a user by displaying "FUEL" 12 on the LCD 40. A user may then initiate a countup sequence by depressing the start/stop button 42, provided that positions 26 (26a, 26b), 28 (28a, 28b) and 30 (30a, 30b) of the LCD 40, which are configured to display hours, minutes and seconds, are all set at zero. If they are not, a user may set them to zero by depressing the reset button 32 before starting the countup sequence. If a time other zero is displayed on the LCD 40, depressing the start/stop button 42 will start a countdown sequence from the time displayed.

Figure 9:
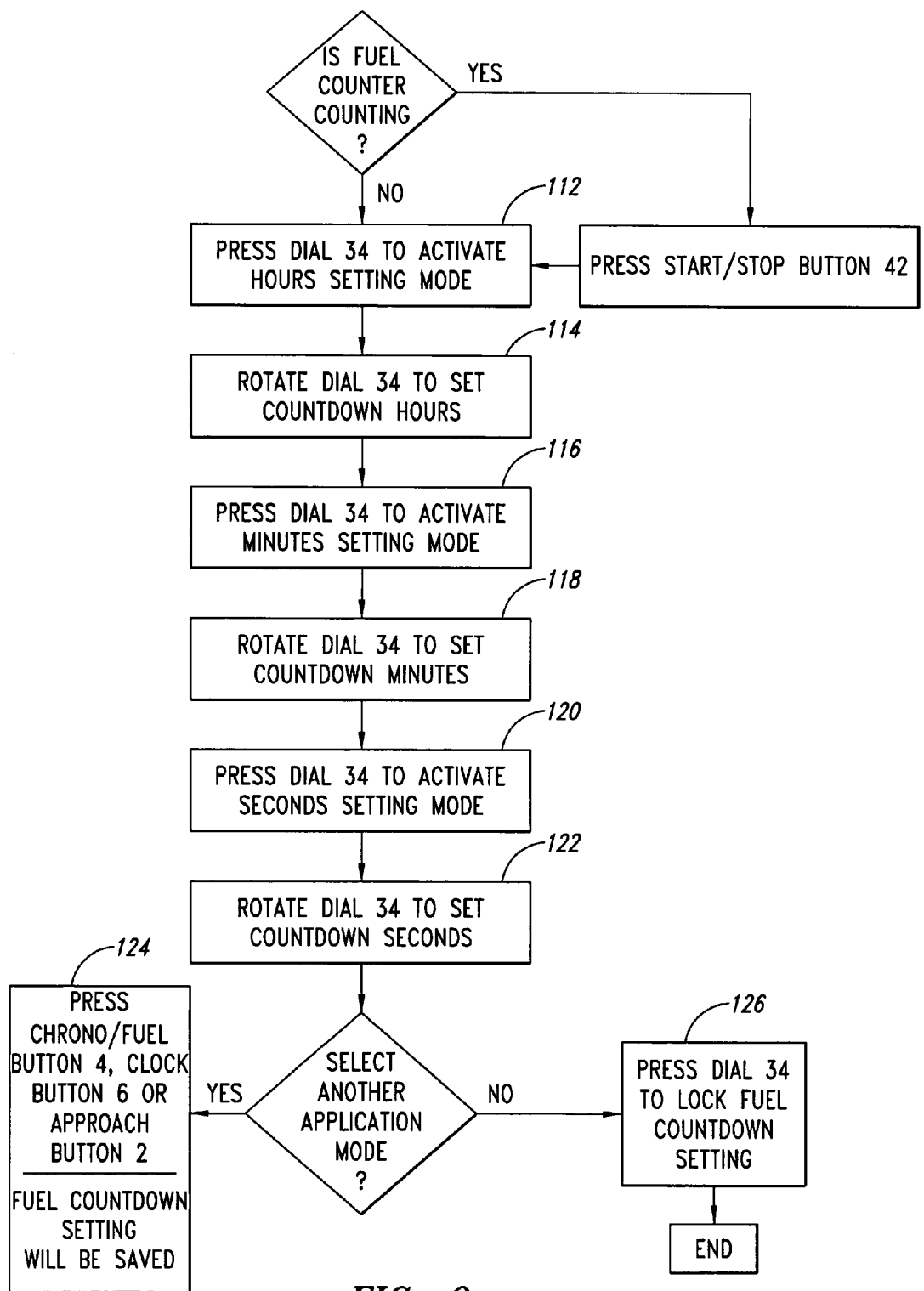
FIG. 9 is a step diagram for the flight timer illustrated in FIG. 1 for setting a fuel countdown time.

A user can set a countdown value for the fuel timer. As best seen in FIG. 9, the steps for setting the countdown value for the fuel timer are substantially similar to the steps for setting the approach times. That is, setting the fuel timer also comprises depressing the dial 34 to activate setting modes for minutes and seconds and the dial 34 can be rotated to select numerical values for entry. However, the fuel mode in the illustrated embodiment also includes active positions 26 (26a, 26b) on the LCD 40 for displaying hours. Therefore, in the illustrated embodiments, depressing the dial 24 will first activate the hours setting mode, which can be set by rotating the dial 34. (See Steps 112 and 113 in FIG. 9). After a user has selected a numerical value for the fuel countdown time, dial 34 can be pressed to lock the setting (until a countdown is started or a new setting is entered) as is the case in the approach mode.

In some embodiments a pilot may set a countdown value in the fuel timer mode, and then countdown from that value before switching fuel tanks. In other embodiments, a pilot may also use a countup sequence from zero in the fuel mode then stop the counter by depressing the start/stop button 42, and switch fuel tanks. The time counted up will have been stored and the pilot may then count down from that stored value while operating on the opposite fuel tank by depressing the start/stop button a second time.

In each of the countdown modes in both the fuel timer mode and approach time modes, the counter can be configured to automatically count up after reaching zero, thereby displaying an overrun time for a user to view. Also, in each of these modes, the alarm 72 can be configured to be engaged when a countdown sequence reaches zero. Furthermore, in each of these modes, the alarm can comprise simultaneous audible and visible alarms, wherein a backlight of the LCD 40 will flash and wherein at least some characters on the display will also flash, whether or not the user has selected a different application mode than the application mode in which the alarm point has been reached. These alarm configurations can be substantially analogous to the alarm configuration described for the approach mode, supra, with the flashing indicator being the corresponding indicator for the application mode in which the alarm point has been reached. Alternatively, in other embodiments, the alarm can comprise various combinations of visible or audible alarms or consist only of a visible alarm or audible alarm.

The user may select a third application mode, the chronograph mode, by depressing button 4. In some embodiments, the chronograph mode may be configured to have only a countup function and not a countdown function. In some embodiments the button 4 will need to be depressed twice to select the chronograph mode. Once chronograph mode is selected, the display position 14 is active, showing the "CHRONO" indicator. Also, display positions 26(26*a*, 26*b*), 28 (28*a*, 28*b*) and 30 (30*a*, 30*b*) are active. In the chronograph mode, those positions display minutes, seconds and hundredths-of-a-second respectively until after 59 minutes, 59 seconds, and 99 hundredths-of-a-second, whereby the positions then display hours, minutes and seconds. The countup sequence in the chronograph mode is started by depressing the start/stop button 42 and ended by doing the same. The reset button can be depressed to restart the countup sequence from zero.

Figure 10:
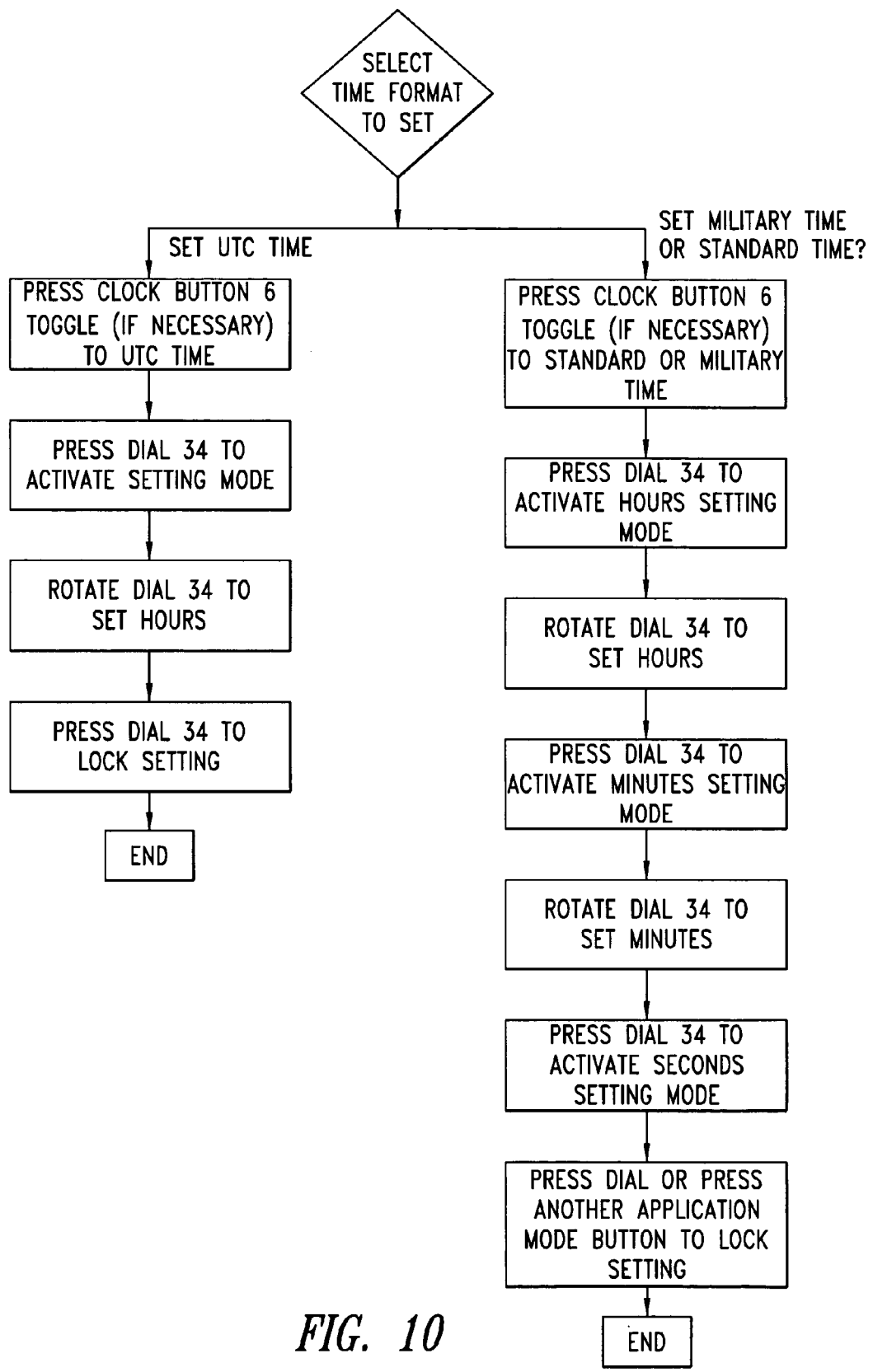
FIG. 10 is a step diagram for the flight timer illustrated in FIG. 1 for setting the clock of the flight timer.
Figure 11:
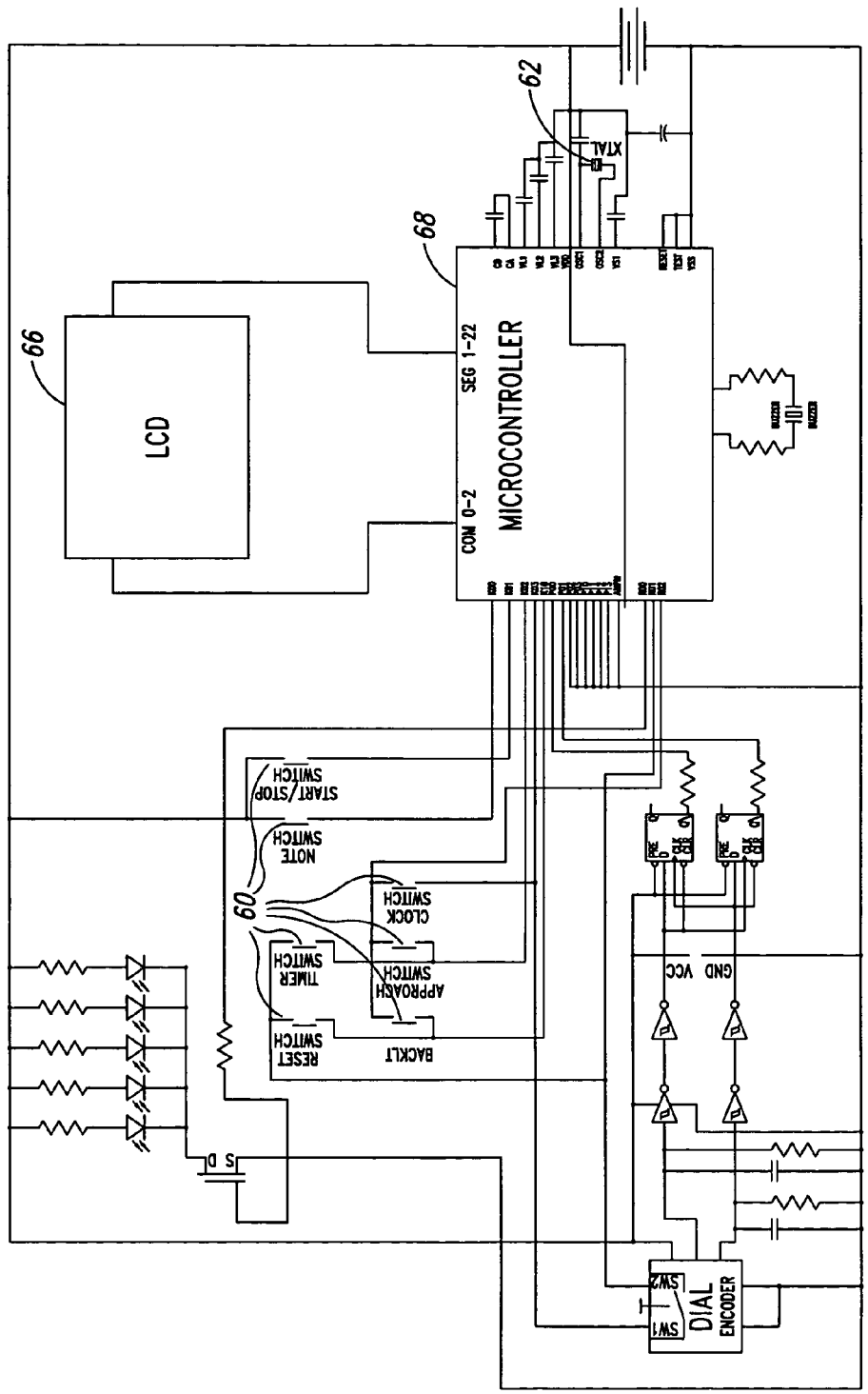
FIG. 11 is a schematic diagram for an embodiment of the flight timer of the present invention.

The fourth mode, the clock mode, can be selected by depressing button 6. This activates display position 16 indicating "CLOCK." Also, display positions 26 (26*a*, 26*b*), 28 (28*a*, 28*b*) and 30(30*a*, 30*b*) are active, said display positions displaying hour, minute and second. The clock mode has three display modes configured for displaying standard time, military time and UTC time (time at the Royal Observatory in Greenwich, England). The clock button 6 can be depressed continuously to toggle between these three display modes. The clock can be set in each of the display modes in substantial accordance with the step diagram in FIG. 10. In yet further embodiments of the present invention, the dial 34 must be depressed and held down for a brief period of time, such as, for example, two (2) seconds, before a user is able to set a time of the clock using the dial 34.

Some embodiments of the present invention also include a note function. The note function can be used to store and display information, including, without limitation, transponder code, future clearance altitude, cruising altitude, critical approach altitude, radio frequencies and other numeric data. It is displayed at position 8 in the LCD 40 of the illustrated embodiment, comprising eight (8) characters. The note can be set by depressing the dial 34 to activate setting mode for the thousands place numbers (two far left characters), then rotating the dial 34 to select those numbers, followed by sequentially depressing dial 34 and rotating dial 34 to select numerical settings for each remaining individual numerical position.

In the illustrated embodiments in FIGS. 1 and 2, a backlight button 36 and lighting element (not shown) is provided to illuminate the LCD when the backlight button is depressed. The backlight can then be switched off by depressing the backlight button 36 a second time. In some embodiments, the backlight will automatically be shut off after five (5) minutes to preserve battery life if the user fails to shut it off. In other embodiments, the backlight can stay on for longer or shorter period of time before automatically shutting off. In still further embodiments, a shutoff time for the backlight can be programmed into the flight timer 1 by a user.

Figure 3:
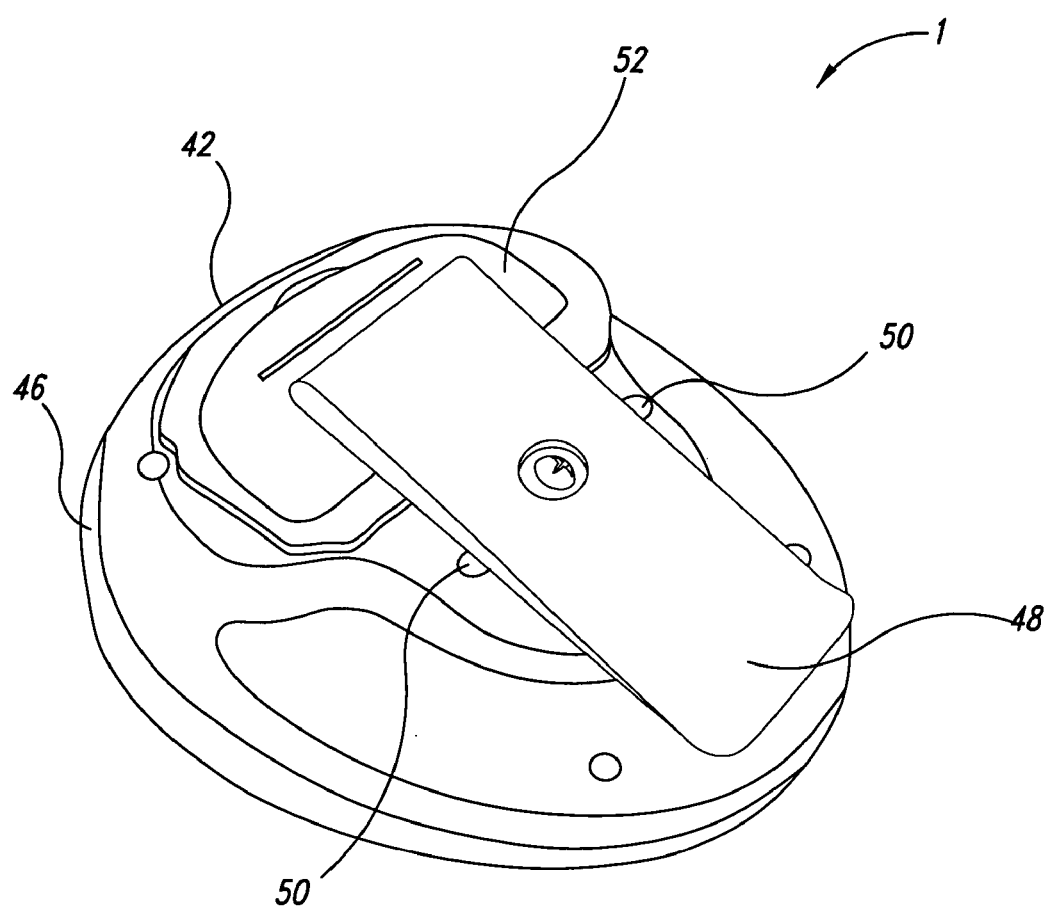
FIG. 3 is a perspective view showing a back portion of the flight timer of FIG. 2.
Figure 4:
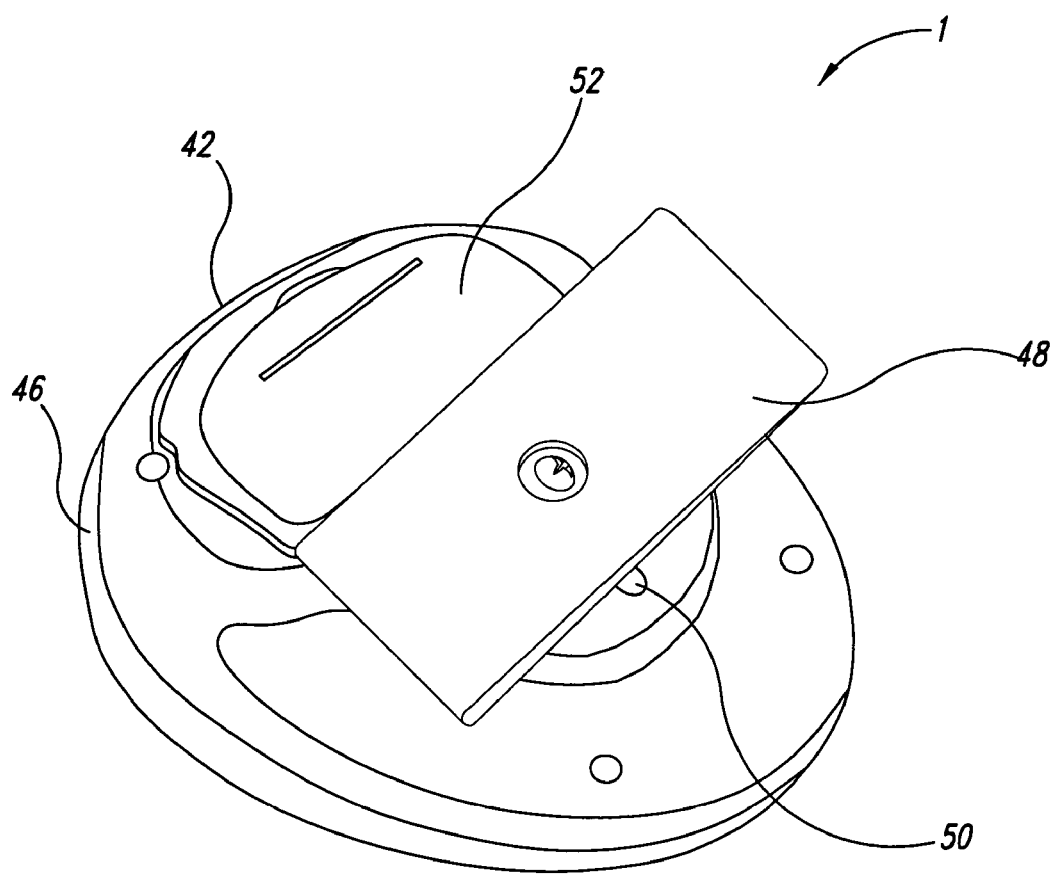
FIG. 4 is a perspective view showing a back portion of the flight timer of FIG. 3 with the clip of the flight timer rotated ninety (90) degrees counterclockwise from its position in FIG. 3.

As best seen in FIGS. 3 and 4 the present invention can include an attachment member 48, such as a clip, for attaching the flight timer 1 to a belt, clipboard, or other surface. The attachment member 48 can be rotatable about a mounting axis to allow flexibility in positioning the flight timer 1 with relation to a surface to which the attachment member 48 is coupled, such as, for example, the long side of a clipboard. A releasable locking mechanism 50 can be provided to help retain the attachment member 48 in a rotated position, such as, for example, detents 50.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A portable flight timer for use in aviation comprising:
   a display system;
   a memory system;
   at least one alarm element;
   a controller with at least one of a peripheral or integral counter;
   a first input element for sending user actuated signals to the controller wherein the controller is connected to the display system, the alarm element and the memory system and wherein a user can store a plurality of approach times into the memory and wherein the plurality of approach times can each be associated with a unique identifier, with each unique identifier being displayable by the display system simultaneously with a corresponding approach time and wherein the at least one of a peripheral or integral counter can be engaged to produce a first counting sequence starting from at least one of the corresponding stored approach times; and
   a manually rotatable input member coupled to the first input element, the manually rotatable input member being operable to actuate the first input element to send signals to the controller.

2. The flight timer of claim 1 wherein the first counting sequence is a countdown sequence.

3. The flight timer of claim 1 wherein the flight timer is capable of driving a second counting sequence simultaneously with, but independently from, the first counting sequence, the second counting sequence being displayable in association with information indicating the relationship of the second counting sequence to fuel.

4. The flight timer of claim 3 wherein the flight timer is capable of driving a third counting sequence simultaneously with, but independently from the first counting sequence and the second counting sequence.

5. The flight timer of claim 4 further comprising a programmable note that is displayable by said display system simultaneously with any of the first counting sequence, second counting sequence and third counting sequence.

6. The flight timer of claim 1 wherein the first counting sequence is a countdown sequence and the controller is configured to activate the alarm element when the countdown sequence reaches a value of zero.

7. The flight timer of claim 6 wherein there are at least two alarm elements with a first alarm element that produces an audible signal and a second alarm element that is a light.

8. The flight timer of claim 7 wherein when the first alarm element and second alarm elements are activated, at least one or more positions on the display flashes until the alarm is stopped by a user actuating a switch of the flight timer.

9. The flight timer of claim 1 wherein the manually rotatable input member is a dial that can be rotated to selectively set values of the approach times.

10. The flight timer of claim 9 wherein the dial can be depressed to store a selected value of an approach time into memory.

11. The flight timer of claim 1 further comprising at least a second input element that can be actuated to display a second counting sequence and to deactivate display of the first counting sequence.

12. The flight timer of claim 11 further comprising at least a third input element that can be actuated to display a clock driven by a counter of the flight timer to produce a time counting sequence independent from the first counting sequence and second counting sequence.

13. The flight timer of claim 12 wherein said clock has three display modes selectable by a user, with each display mode displaying hours, minutes and seconds and with each display mode being interdependent with the other of the said display modes in that setting any one of the minutes and seconds on a first display mode also sets minutes and seconds on the other of the display modes, and with at least the hour setting of at least one of the three display modes being independent of the hours setting of the other of said display modes.

14. The flight timer of claim 1 further comprising an attachment member connected to a back portion of the flight timer for attaching the flight timer to a surface.

15. The flight timer of claim 14 wherein the attachment member is a clip.

16. A portable flight timer for use in aviation comprising:
a display system;
a memory system;
at least one alarm element;
an oscillator;
a controller with at least one of a peripheral or integral counter;
a first input element for sending user actuated signals to the controller wherein the controller is connected to the display system, the alarm element and the memory system and wherein a user can store a plurality of approach times into the memory and the approach times can be recalled and displayed by the display system simultaneously with an indicator having a relationship to approach times to inform a user that the time displayed is an approach time and wherein the plurality of approach times can each be associated with a unique identifier displayable by the display system simultaneously with a corresponding approach time and wherein the at least one of a peripheral or integral counter can be engaged to produce a countdown sequence starting from the corresponding stored approach time; and
a dial coupled to the first input element, the dial being operable to actuate the first input element to send signals to the controller.

* * * * *